Sept. 21, 1965   R. L. CARLSTEDT   3,207,014
METHOD AND APPARATUS FOR DAMPING VIBRATIONS
Filed Sept. 24, 1962   2 Sheets-Sheet 1

INVENTOR.
RAGNAR L. CARLSTEDT
BY Toulmin & Toulmin
ATTORNEYS

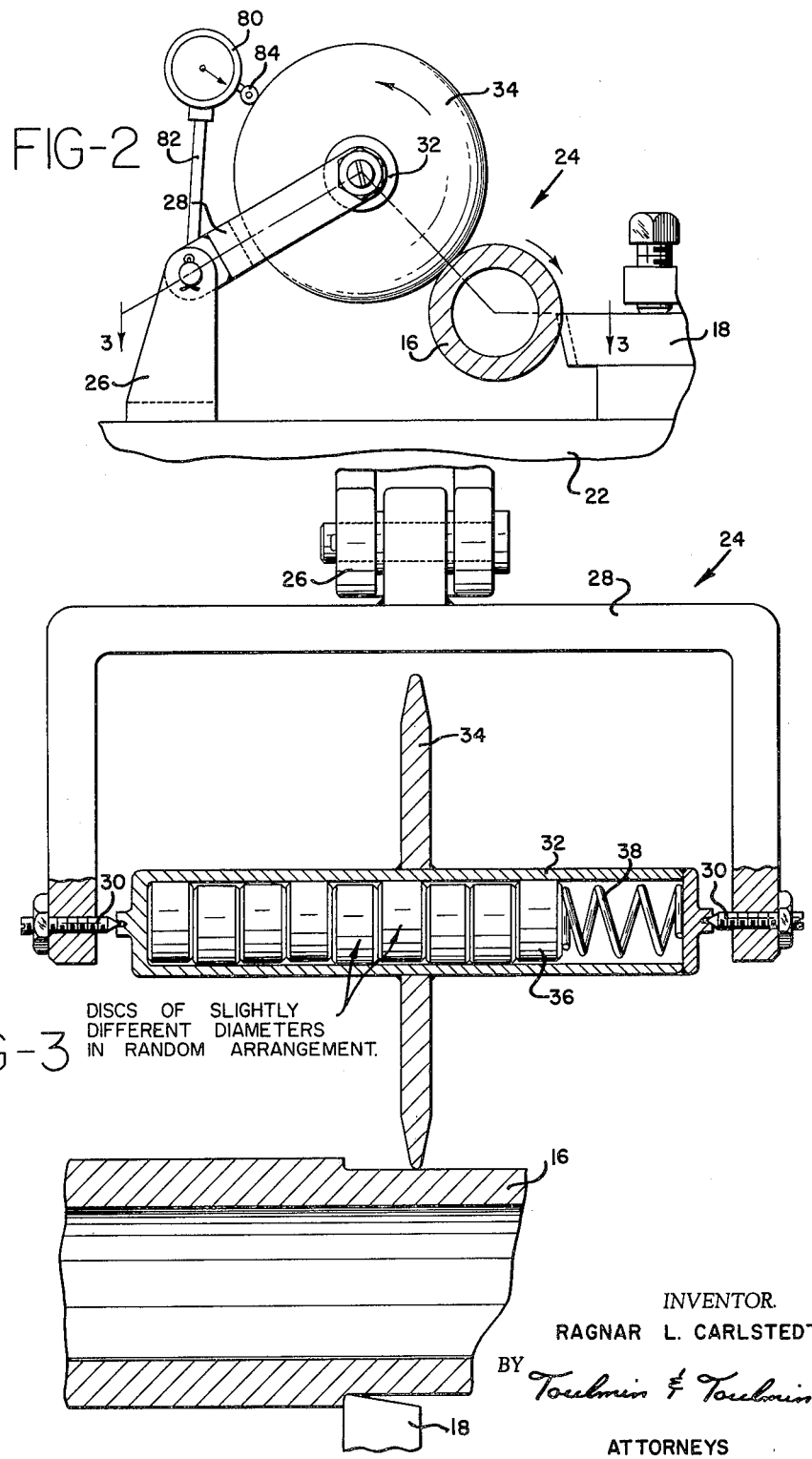

United States Patent Office 3,207,014
Patented Sept. 21, 1965

3,207,014
METHOD AND APPARATUS FOR
DAMPING VIBRATIONS
Ragnar L. Carlstedt, Valley Heights, Pa., assignor to Kennametal, Inc., Latrobe, Pa., a corporation of Pennsylvania
Filed Sept. 24, 1962, Ser. No. 225,438
17 Claims. (Cl. 82—34)

This invention relates to a method and apparatus for damping out vibrations and is particularly concerned with such a method and apparatus in connection with damping out vibrations that are set up in a workpiece while it is being turned in a machine tool.

The present application is related to my prior application Serial No. 188,209 filed April 17, 1962, and entitled: Vibration Damping Device, and now abandoned. In the application referred to above, I show an arrangement whereby a hollow workpiece that is to be turned can be prevented from vibrating or chattering as it is being turned by placing therein a plurality of weight elements having limited travel laterally of the workpiece, and with different amounts of travel of the individual weights.

These weights are preferably held in face to face engagement under light spring pressure so the movement thereof is at least slightly frictionally restrained. What occurs is that any tendency for the workpiece to vibrate brings about random lateral movement of the weights within the workpiece and it has been found that this substantially eliminates vibration and chattering of the workpiece so that it can be turned to a relatively smooth finish and within predetermined dimensional limits.

Excessive vibration or chattering, of course, produces a most inferior finish and the size of the turned workpiece can also be too small on account of the lateral movement of the workpiece due to the chattering.

While such a device has proved eminently satisfactory in connection with preventing the vibration or chattering of tubular work members, it is useful only with tubular members because it requires that the device be inserted inside the member. Certain definite limitations are thus imposed in connection with the use of such a device because it must set within the workpiece with a certain amount of clearance in order to produce the best results and any substantial change in the inside diameter of the workpiece requires a different device.

Still further, any workpiece having a poor or irregular finish on the inside would not be well adapted to the use of such a device on account of the varying lateral distances on the inside of the workpiece that effect the striking of the workpiece by the weights therein.

By test and experiment, I have discovered that the idea of the multiple weights movable laterally to effect vibration damping can be adapted to a large class of workpieces, including the aforementioned tubular workpieces, and that excellent results can be obtained and that this can be done without introducing a vibration dampener into the workpieces.

This is done, according to the present invention, by applying the multiple weight device externally of the workpiece instead of internally.

By applying the device externally of the workpiece, the time required for inserting a device into the workpiece and removing it therefrom is eliminated and the necessity of selecting a device of exactly the right size for any given internal diameter of workpiece is eliminated. At the same time, the device, when applied externally of the workpiece, in accordance with the teachings of the present invention, enables the practice of the present invention without regard to the diameter of the workpiece or the length thereof and the possibility also presents itself that other vibration problems, such as the vibration of rotary tools, milling cutters, for example, and the like can be dealt with in a very simple manner.

The device of the present invention consists, in short, of a tube having therein a plurality of disc-like weights slightly smaller than the tube and different slightly in diameter from each other and disposed in the tube in random manner and lightly pressed against each other by a spring. This tube is rotatably supported and comprises a wheel or roller portion integral therewith that rides on the member the vibration of which is to be damped.

Such a member might comprise a rotating workpiece or it might comprise a rotary tool such as a milling cutter. Any tendency of the member to be vibrated results in random movement of the weights within the tube and the shocks imparted to the tube by the weights is transferred back to the workpiece and prevents vibration thereof.

Having the foregoing in mind, a primary object of the present invention is the provision of a method and apparatus for damping out vibrations in rotary members, such as workpieces being cut in a machine tool, or rotating machine tool cutters.

Another object of this invention is the provision of a vibration damping device of the nature referred to which is generally applicable and does not have to be precisely fitted to the member being treated.

A still further object of the present invention is the provision of a method and apparatus for damping out vibrations of a rotating member which is effective for damping out vibrations of a wide range of character, including self-excited vibrations and harmonics thereof and the like.

A still further object of this invention is the provision of a simple device that can be brought into association with a rotating member that tends to vibrate or chatter and which device will damp out the vibrations or chattering without any change in the member being controlled and without any change in the mode of operation thereof.

Still further, another object of this invention is the provision of a simple vibration damping device and a method of operation which can be manufactured and sold as a unit and which can easily be incorporated in existing machines, lathes, or milling machines or the like, for example.

These and other objects and advantages of this invention will become more apparent upon reference to the following specification, taken in connection with the accompanying drawings, in which:

FIGURE 2 is a transverse sectional view indicated by line 2—2 on FIGURE 1 and shows the vibration damping device, the workpiece, and the cutting tool;

FIGURE 3 is a plan sectional view indicated by line 3—3 on FIGURE 2 showing the workpiece in cross section and showing the engagement thereof with the cutting tool and also showing a vibration damping device of the present invention engaging the workpiece;

Figure 1:
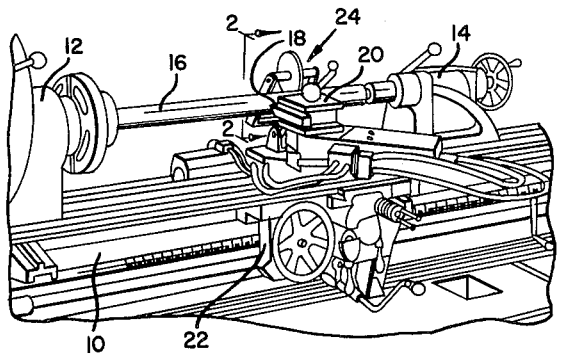
FIGURE 1 is a more or less diagrammatic perspective view showing a portion of the lathe and an elongated workpiece being turned therein and with a vibration damping device according to the present invention engaging the workpiece.

Referring to the drawings somewhat more in detail, FIGURE 1 shows a lathe which may comprise a bed 10, a headstock 12 and a tailstock 14. Workpiece 16 is supported between the headstock and tailstock and is driven in rotation so that it can be turned by a cutter 18 carried on a tool slide 20. Mounted in some suitable manner on carriage 22 of the lathe is the vibration damping device according to the present invention which is generally indicated at 24.

The vibration damping device and the manner in which it engages the workpiece will be more clearly seen in FIGURES 2 and 3. In FIGURE 2, the carriage 22 is shown diagrammatically and it will be seen that it supports the cutting tool 18 at one side of workpiece 16 while, at the other side thereof, it supports bracket 26 to which arm 28 is pivoted. Arm 28, as will be seen in FIGURE 3, is bifurcated and rotatably supports between the ends of the legs thereof, as by pointed pivot screws 30, a tubular element 32.

This tubular element has integral therewith or fixed thereto a wheel or roller element 34 which directly engages workpiece 16 preferably a substantial distance above the lateral center line thereof so that the weight of the device actually bears against the workpiece. As illustrated in FIGURE 2, the direction of the force transmitted from the device to the workpiece is generally opposite to the force exerted on the workpiece by cutting tool 18. However, exact opposition of these forces is not essential.

Within tube 32 are disposed the discs or rings 36 all of which are at least slightly smaller in diameter than the inside diameter of tube 32. The rings or discs, likewise, differ slightly from each other in diameter. The discs or rings are disposed in random manner, with respect to the diameters thereof, within tube 32. Usually, three to five different diameters varying at a few thousandths of an inch from each other is sufficient with the individual discs being from two to four thousandths of an inch or so smaller in diameter than the inside diameter of tube 32.

These discs or rings are preferably of an extremely high density metal, a suitable composition for this purpose consisting of an alloy of ninety percent tungsten and ten percent a nickel copper alloy. The specific gravity of this composition is about seventeen and this provides for extremely heavy discs.

These discs are also quite hard and the tube 32 is preferably hard material so that lateral movement of the discs in the tube will transmit shocks to the tube. Tube 32 is relatively thin walled and wheel or roller 34 is preferably relatively thin so that the bulk of the mass of the rotating portion of the device resides in the discs.

The discs are disposed within tube 32 except for the provision of a compression spring 38 which holds the discs in face to face engagement so that they are slightly frictionally restrained against absolutely free lateral movement within the tube.

In operation, I have found that an elongated work member, such as is illustrated at 16, can only be turned with considerable difficulty if chatter or vibration thereof is to be avoided. Such chatter or vibration is, of course, extremely objectionable because even a small amount of chatter and vibration will prevent turning the workpiece to an accurate size and will leave such a deeply patterned finish that it cannot be cleaned up by any conventional cleaning procedures.

This is the case with both tubular or solid work members. The degree and character of the vibration will, of course, vary with the nature of the workpiece and the composition thereof and the length, but in almost every case, except for short stiff workpieces, there will be a desirable turning condition that cannot be achieved on account of vibration.

I have found that a work member of the nature referred to which tends to vibrate and chatter can be prevented from vibrating and chattering merely by engaging the workpiece with the damping device illustrated and described above. In actual tests and experiments, I have demonstrated that the workpiece will commence to chatter when the damping device is lifted therefrom and will continue to chatter and vibrate until the device is again brought into engagement with the workpiece whereupon, as soon as the device commences to rotate, the vibrations will cease.

I have tested the device for a number of different turning conditions, namely, different speeds and feeds and different depths of tool penetration and I have found that the device is acceptable over an extremely wide range of such conditions.

With an elongated member of the nature illustrated, the character of the vibration and chattering will change from place to place along the length of the workpiece and the chatter patterns on the surface of the workpiece will be markedly different between, for example, the middle of the workpiece and positions near the ends thereof.

The damping device of the present invention, however, accommodates itself automatically to these changes and damps out vibrations at every point along the workpiece.

While the device is arranged to move along the workpiece with the cutting tool, and preferably engages the work member in the turned region immediately behind the cutting tool, I find that the exact point of application of the device can be varied relatively widely so long as it is kept within the general region of the part of the workpiece being turned.

The device could thus engage the workpiece ahead of the cutting tool if the workpiece surface were not so rough as to cause the device to bounce on the workpiece and the device could, likewise, engage the workpiece a substantial distance behind the cutting tool and effective damping results would obtain.

The exact point of engagement of the workpiece by the device circumferentially of the workpiece is also variable so long as the device and the workpiece remain in intimate force transmitting relation. As a matter of convenience, the device is supported so that it can be swung upwardly off the workpiece to permit removing the workpiece from the machine and then dropped downwardly on the workpiece to bear against the workpiece with a certain force.

The device, however, could be pressed against the workpiece from below and excellent results would obtain and it could engage the workpiece from either directly above or at substantially any other point about the periphery thereof.

The size of the device is variable within wide limits and it can itself be heavy enough to provide the necessary force between the device and the workpiece, or it can be relatively light and be pressed against the workpiece by added thrust supplied by a fluid motor or a spring.

Figure 4:
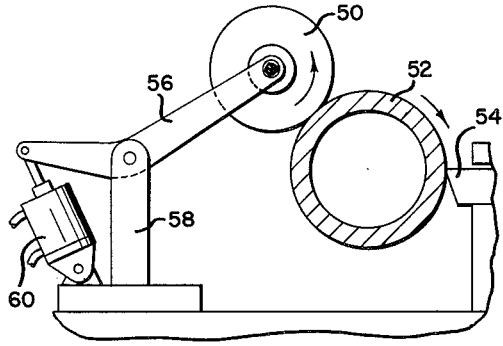
FIGURE 4 is a view similar to FIGURE 2 but shows how the vibration damping device could be pressed against the workpiece as by a fluid pressure device.

In FIGURE 4, for example, I show an arrangement where a smaller or lighter dampening device 50 engages a workpiece 52 being turned by a tool 54. Device 50 is carried in arm 56 pivoted to a bracket 58 and the arm 56 is biased by a spring or a fluid motor 60 to bring device 50 into pressure engagement with the surface of workpiece 52.

The devices heretofore described have been of the type in which the device is caused to rotate by engagement with the workpiece. However, I have discovered it is not necessary for the device to rotate to provide for adequate damping so long as the device can be held in engagement with the workpiece so that the device itself is not caused to vibrate or chatter except as such vibrations are transmitted thereto from the workpiece.

Figure 5:
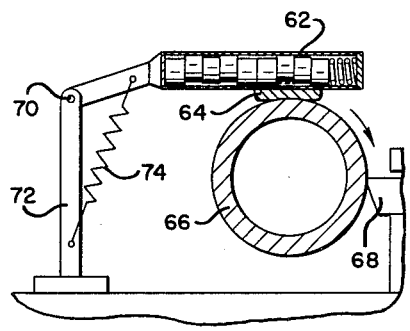
FIGURE 5 is a sectional view similar to FIGURES 2 and 4 but shows a modification wherein the vibration damping device engages the member to be controlled by means of a slide shoe instead of a roller.

An arrangement of this nature is shown in FIGURE 5 wherein a device 62 according to this invention and comprising a tube and heavy discs therein carries a shoe 64, nylon, for example, which bears against the periphery of the workpiece 66 that is being cut by tool 68. The device is pivoted at 70 on a support 72 so that it can be dropped on the workpiece or lifted therefrom. The device could, of course, be urged against the workpiece as by means of a spring 74 or a fluid motor such as was referred to in connection with the FIGURE 4 modification. I have found the device of FIGURE 5 to be effective for damping vibrations in most cases.

It is mentioned previously that the device of the present invention could be employed for damping out vibrations of rotating members other than rotating workpieces. An arrangement wherein the device is applied to a rotating milling cutter is diagrammatically shown in FIGURE 6.

Figure 6:
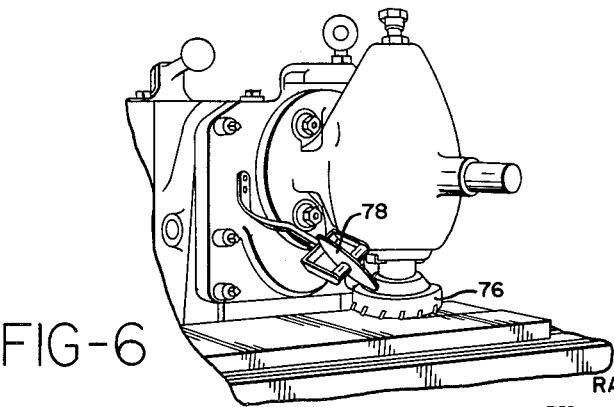
FIGURE 6 is a somewhat diagrammatic view showing the application of a device according to my invention to a milling cutter.

In FIGURE 6, the milling cutter is identified at 76 and the device of the present invention at 78. The device is supported so that it can be moved into engagement with the milling cutter, preferably at an angle to the axis of rotation thereof and the device may, as mentioned before, be pressed against the milling cutter by spring means or fluid motor means.

The device has proved effective for eliminating vibration in the milling cutter so that much smoother finishes are obtained on the workpiece being operated.

In connection with the application of the device to a rotating workpiece, while it has been shown engaging the workpiece with a thrust radial to the workpiece, it will be understood that the device could engage the workpiece angularly, such as engaging the shoulder being turned by the cutting tool and the damping of lateral vibrations of the workpiece would still be accomplished.

In addition to damping out lateral vibrations, engagement of the device in the described angular manner would also tend to damp out any longitudinal vibrations that might occur in the workpiece. Longitudinal vibrations are not usually of a serious nature, but the possibility exists of eliminating these virbations where they do represent a problem.

It will also be evident that it is within the purview of the present invention to emply the vibration dampener, and the method of the present invention, in damping out vibrations that might be set up in discs or members of other configurations, such as conical or large concave members. The device according to the present invention is generally applicable because it can be applied to either face of such a member and at any point thereon circumferentially or axially where the device produced the best results.

With the device of the present invention, there is no need to fit the device precisely to the member to be controlled as is the case with the damping device of my prior application above referred to, but general application of my method can now be had in dealing with substantially any localized vibration problem.

To summarize, with the damping out of vibrations by the use of an apparatus according to the present invention, the vibrations from the member are, via the contact point, transferred to the apparatus and the vibration of the housing of the apparatus (housing) will cause the slugs (discs or rings) to knock and to create a disharmony with the vibration transferred to the apparatus from the member. These vibrations of the apparatus caused by the slugs will be transferred in the opposite direction to the member and counteract the vibration of the member thereby decreasing the amplitude.

The apparatus can be used on all rotating or non-rotating members and no changes of the member are necessary. It can be used for damping vibration on members such as spindles, axles, gears, drums and rotors. It can also be used on workpieces to dampen vibration created from cutting forces.

It can be used as a "follower-rest" when turning, even if the diameter varies thereby decreasing deflection of vibratory nature.

The apparatus can also decrease deflection of the workpieces if it is applied opposite the resultant of the cutting forces with a force corresponding to the resultant cutting force. This force can be achieved either by spring presssure or hydraulic or pneumatic pressure.

Normally, damping devices for rotating members can either take care of radial or axial vibration, not both at the same time, but if the apparatus is placed at an angle to the rotation center, 45°, as an example, it can take care of radial as well as axial vibrations.

It can be placed close to the source of vibration and also where the amplitude is the largest.

When the rotating member is rotating with high speed, the apparatus could rotate at such a speed that the centrifugal force would be so large that the slugs would be arrested on the inside wall and would not counteract. In fact, they could even cause vibration due to an unbalanced condition. In such a case, the apparatus can have a wheel which is larger than the member thereby reducing the speed, or the sliding contact of FIGURE 5 could be used.

It is obvious that if the contact pressure is small, the vibration damping device can only take care of deflection of a purely vibratory nature. To take care of deflection created by the cutting force, the contact pressure should be almost equal to the cutting force and in the opposite direction to the cutting force. This can be achieved by using spring load or hydraulic or pneumatic pressure (FIG. 4).

An auxiliary feature of my invention resides in the fact that where the member to be controlled is rotating, thus causing rotation of the vibration damping device, it would be a simple matter to employ a surface speed indicator in the combination. This could be done as indicated in FIGURE 2 wherein there is diagrammatically illustrated a surface speed indicator 80 carried on a support 82 attached to bracket 28.

Indicator 80 includes a drive roller 84 that bears on the periphery of drive disc 34. The surface speed of rotation of drive element 84 would, of course, be equal to the surface speed of work member 16.

It is to be understood that, while I have illustrated the present invention specifically in connection with rotary workpieces, it will be understood that the invention is also applicable to non-rotating workpieces which might have a tendency to vibrate at some natural frequency when being worked by a tool, such as a drill or the like. The same effective vibration damping would be had by engaging such a work member at the proper place and with the proper force by a vibration damping device according to the present invention.

It will be understood that this invention is susceptible to modification in order to adapt it to different usages and conditions; and accordingly, it is desired to comprehend such modifications within this invention as may fall within the scope of the appended claims.

I claim:

1. A device for damping out vibrations in a relatively stiff member; a tubular element, a plurality of disclike slugs in the element in adjacent relation movable relatively freely laterally within said element so as to impact against the tubular member, said slugs having different degrees of freedom of movement within said tubular element laterally thereof so the impacts delivered thereby to the tubular element will be at random frequency, and means for effecting non-resilient engagement of said tubular element with said member.

2. A device for damping out vibrations in a relatively stiff member; a tubular element, a plurality of disc-like slugs in the element in adjacent relation movable relatively freely laterally within said element so as to impact against the tubular member, said slugs having different degrees of freedom of movement within said tubular element laterally thereof so the impacts delivered thereby to the tubular element will be at random frequency, and means for effecting shock transmitting engagement of said tubular element with a vibratory portion of said member.

3. A device for damping out vibrations in a relatively stiff member; a tubular element, a plurality of disc-like slugs in the element in adjacent relation movable relatively freely laterally within said element so as to impact against the tubular member, said slugs having different degrees of freedom of movement within said tubular element laterally thereof so the impacts delivered thereby to the tubular element will be at random frequency, and means for effecting shock transmitting engagement of said tubular element with a vibratory portion of said member, said means comprising a slide shoe fixed to said tubular element and adapted for sliding engagement with said member.

4. A device for damping out vibrations in a relatively stiff rotating member; a relatively light weight stiff tubular element, a plurality of heavy rigid discs in side by side relation in said element, said discs comprising a plurality of slightly different diameters, said discs being slightly smaller in diameter than the inside of said tubular element whereby lateral movement of the discs in the tubular element will deliver impacts thereto at random frequency, means supporting said tubular element for rotation thereof on its longitudinal axis and for bodily movement laterally of said axis, and a circular drive wheel fixed to said tubular element and substantially coaxial therewith for engagement with the surface of said rotating member.

5. A device for damping out vibrations in a relatively stiff rotating member; a relatively light weight stiff tubular element, a plurality of heavy rigid discs in side by side relation in said element, said discs comprising a plurality of slightly different diameters, said discs being slightly smaller in diameter than the inside of said tubular element whereby lateral movement of the discs in the tubular element will deliver impacts thereto at random frequency, spring means lightly pressing said discs toward each other, means supporting said tubular element for rotation thereof on its longitudinal axis and for bodily movement laterally of said axis, and a circular drive wheel on said tubular element and coaxial therewith for engagement with the surface of said rotating member.

6. A device for damping out vibrations in a relatively stiff rotating member; a relatively light weight stiff tubular element, a plurality of heavy rigid discs in side by side relation in said element, said discs comprising a plurality of slightly different diameters, said discs being slightly smaller in diameter than the inside of said tubular element whereby lateral movement of the discs in the tubular element will deliver impacts thereto at random frequency, spring means lightly pressing said discs toward each other, means supporting said tubular element for rotation thereof on its longitudinal axis and for bodily movement laterally of said axis, and a circular drive wheel on said tubular element coaxial therewith for engagement with the surface of said rotating member, said drive wheel being located in about the middle of said tubular element, and means for urging said element together with said drive wheel toward said member while in engagement therewith.

7. A device according to claim 6 in which the last mentioned means is a spring.

8. A device according to claim 6 in which the last mentioned means is fluid operated.

9. A device for damping out vibrations in a relatively stiff rotating member; a relatively light weight stiff tubular element, a plurality of heavy rigid discs in side by side relation in said element, said discs comprising a plurality of slightly different diameters, said discs being slightly smaller in diameter than the inside of said tubular element whereby lateral movement of the discs in the tubular element will deliver impacts thereto at random frequency, means supporting said tubular element for rotation thereon on its longitudinal axis, and a circular drive wheel on said tubular element for engagement with the surface of said rotating member, said means rotatably supporting said tubular element comprising a yoke having bearing means engaging said tubular element at its opposite ends, and a bracket pivotally supporting said yoke on an axis spaced from the axis of said tubular element and extending at an angle substantially parallel to the axis of rotation of said member.

10. A device for damping out vibrations in a relatively stiff rotating member; a relatively light weight stiff tubular element, a plurality of heavy rigid discs in side by side relation in said element, said discs comprising a plurality of slightly different diameters, said discs being slightly smaller in diameter than the inside of said tubular element whereby lateral movement of the discs in the tubular element will deliver impacts thereto at random frequency, means supporting said tubular element for rotation thereon on its longitudinal axis, and a circular drive wheel on said tubular element for engagement with the surface of said rotating member, said means rotatably supporting said tubular element comprising a yoke having bearing means engaging said tubular element at its opposite ends, and a bracket pivotally supporting said yoke on an axis spaced from the axis of said tubular element and extending at an angle to the axis of rotation of said member.

11. In combination: means for supporting a workpiece for rotation on a work axis, carriage means supporting a tool for cutting engagement with the workpiece, and vibration damping means supported on the carriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein; a bracket pivotally supporting said tubular element attached to the carriage means, and means on the tubular element for direct engagement with the surface of said workpiece.

12. In combination: means for supporting a workpiece for rotation on a work axis, carriage means supporting a tool for cutting engagement with the workpiece, and vibration damping means supported on the carriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein, a bracket pivotally supporting said tubular element and attached to the carriage means, and a slide shoe on the tubular element for direct engagement with the surface of said workpiece.

13. In combination: means for supporting a workpiece for rotation on a work axis, carriage means supporting a tool for cutting engagement with the workpiece, and vibration damping means supported on the carrriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein, a bracket pivotally supporting said tubular element and attached to the carriage means, a slide shoe on the tubular element for direct engagement with the surface of said workpiece, and means biasing said tubular element toward said workpiece.

14. In combination: means for supporting a workpiece for rotation on a work axis, carriage means supporting a tool for cutting engagement with the workpiece, and vibration damping means supported on the carriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein, a bracket pivotally supporting said tubular element and attached to the carriage means, said bracket having bearing means supporting said tubular element for rotation on its axis, and a wheel on said tubular element for engagement with the surface of said workpiece.

15. In combination: means for supporting a workpiece for rotation on a work axis, carriage means supporting a tool for cutting engagement with the workpiece, and vibration damping means supported on the carriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein, a bracket pivotally supporting said tubular element and attached to the carriage means, said bracket having bearing means supporting said tubular element for rotation on its axis, a wheel on said tubular element for engagement with the surface of said workpiece, and means biasing said tubular element toward said workpiece.

16. In combination: means for supporting a workpiece for rotation on a work axis, carriage means supporting a tool for cutting engagement with the workpiece, and vibration damping means supported on the carriage means for engagement with the workpiece at a point generally opposite the point of engagement of the tool therewith, said damping means comprising a tubular element, a plurality of heavy discs in said tubular element having a plurality of respectively different degrees of slight freedom of lateral movement therein; a bracket pivotally supporting said tubular element and attached to the carriage means, and means on the tubular element for direct engagement with the surface of said workpiece, the point of engagement of the tubular element with the workpiece being substantially on the line of thrust of the tool on the workpiece, and means thrusting the tubular element toward the workpiece to obtain a steady rest action thereby in addition to vibration damping.

17. A device for damping out vibrations in a relatively stiff rotating member; a relatively light weight stiff tubular element, a plurality of heavy rigid discs in side by side relation in said element, and said discs comprising a plurality of slightly different diameters, said discs being slightly smaller in diameter than the inside of said tubular element whereby lateral movement of the discs in the tubular element will deliver impacts thereto at random frequency, means supporting said tubular element for rotation thereof on its longitudinal axis, a circular drive wheel on said tubular element for engagement with the surface of said rotating member, and a surface speed indicator operatively engaging said drive wheel for indicating the surface speed of the member driving said drive wheel.

References Cited by the Examiner
UNITED STATES PATENTS

| | | | |
|---|---|---|---|
| 602,965 | 4/98 | Walker | 82—39 X |
| 2,155,052 | 4/39 | Byland. | |
| 2,275,783 | 3/42 | Martellotti | 90—20.5 |
| 2,826,094 | 3/58 | Johnson. | |
| 2,960,189 | 11/60 | Osburn. | |
| 3,033,318 | 5/62 | Jewell. | |
| 3,091,985 | 6/63 | Whalen | 83—38 |

WILLIAM W. DYER, JR., *Primary Examiner.*